United States Patent
Hesse et al.

(10) Patent No.: US 7,964,256 B2
(45) Date of Patent: Jun. 21, 2011

(54) HOUSING SHELL FOR AN ELECTRONIC DEVICE

(75) Inventors: Gunter Hesse, Gerolsheim (DE); Ralf Neuhaus, Heidelberg (DE); Karl-Michael Reinfrank, Edenkoben (DE); Robert Kroib, Heppenheim (DE); Gunter Schobel, Gernsheim (DE); Wolfgang Gutting, Grobfischlingen (DE); Klaus Uske, Bad Durkheim (DE); Mark Szendro, Bad Durkheim (DE)

(73) Assignee: BASF SE (DE)

( * ) Notice: Subject to any disclaimer, the term of this patent is extended or adjusted under 35 U.S.C. 154(b) by 462 days.

(21) Appl. No.: 10/563,901

(22) PCT Filed: Jul. 9, 2004

(86) PCT No.: PCT/EP2004/007559
§ 371 (c)(1), (2), (4) Date: Jun. 5, 2006

(87) PCT Pub. No.: WO2005/005543
PCT Pub. Date: Jan. 20, 2005

(65) Prior Publication Data
US 2007/0043149 A1 Feb. 22, 2007

(30) Foreign Application Priority Data
Jul. 9, 2003 (DE) .................... 103 31 169

(51) Int. Cl.
*B65D 1/00* (2006.01)
*H01L 23/06* (2006.01)
(52) U.S. Cl. ................... 428/35.7; 428/36.4; 428/36.92; 174/565
(58) Field of Classification Search .............. 428/34.1, 428/35.7, 36.4, 36.5, 36.6, 36.9, 36.92; 174/520, 174/565
See application file for complete search history.

(56) References Cited

U.S. PATENT DOCUMENTS

| | | | |
|---|---|---|---|
| 4,001,177 A | 1/1977 | Tsutsumi et al. | |
| 5,256,718 A | 10/1993 | Yamamoto et al. | |
| 5,567,797 A * | 10/1996 | Christ et al. | 528/310 |
| 5,728,104 A * | 3/1998 | Trotta | 606/108 |
| 5,773,556 A | 6/1998 | Kleiner et al. | |
| 6,184,282 B1 | 2/2001 | Gareiss et al. | |
| 6,228,912 B1 * | 5/2001 | Campbell et al. | 524/100 |
| 6,783,821 B2 * | 8/2004 | Ries et al. | 428/34.1 |
| 6,790,887 B1 * | 9/2004 | Nishihara | 524/120 |
| 7,049,391 B2 * | 5/2006 | Gahr et al. | 528/310 |
| 7,491,792 B2 * | 2/2009 | Monsheimer et al. | 528/480 |
| 2001/0008913 A1 | 7/2001 | Flippo et al. | |

FOREIGN PATENT DOCUMENTS

| | | |
|---|---|---|
| DE | 28 27 867 | 1/1980 |
| DE | 196 07 635 | 9/1997 |
| DE | 199 44 352 | 9/1999 |
| EP | 0 469 930 | 2/1991 |
| EP | 0 616 008 | 9/1994 |
| EP | 0 927 742 | 7/1999 |
| GB | 2 097 008 | 10/1982 |
| JP | 6128480 | 5/1994 |
| JP | 8041312 | 2/1996 |
| JP | 8283572 | 10/1996 |
| JP | 10130495 | 5/1998 |
| JP | 2002173531 | 6/2002 |
| JP | 2002338805 | 11/2002 |
| WO | WO-02/28953 | 4/2002 |

* cited by examiner

*Primary Examiner* — Rena L Dye
*Assistant Examiner* — Walter B Aughenbaugh
(74) *Attorney, Agent, or Firm* — Connolly Bove Lodge & Hutz

(57) ABSTRACT

A casing for an electronic device is produced from a heat-resistant, flame-retardant thermoplastic by an injection-molding process. This thermoplastic is a polyimide-based plastic with halogen-free flame retardancy.

6 Claims, No Drawings

HOUSING SHELL FOR AN ELECTRONIC DEVICE

RELATED APPLICATIONS

This application is a national stage application (under 35 U.S.C. 371) of PCT/EP2004/007559 filed Jul. 9, 2004 which claims benefit to German application 103 31 169.6 filed Jul. 9, 2003.

The present invention relates to a casing for an electronic device, composed of a heat-resistant thermoplastic with halogen-free flame retardancy, and to the use of the plastic for producing these casings by injection molding.

Large-surface-area casings for electronic devices are generally produced nowadays from thermoplastics. A particular factor to be considered in the case of these electronic devices in which a screen is present, e.g. televisions, video monitors, or computer monitors, is that large amounts of heat are emitted by the electronic components, and that the housing can therefore become extremely hot.

For reasons of product safety, flame retardants are in some cases added to the thermoplastics in order to prevent fire, or delay the spread of fire, in the event of malfunctioning of the device or exposure to external heat, from a burning candle, for example. However, many of these flame retardants are halogenated and therefore themselves create an additional risk, because the use of these chemicals gives rise to toxicological concerns. For this reason, use has for some time also been made of thermoplastics with halogen-free flame retardancy, e.g. polyblends comprised of polyphenylene ether and impact-resistant polystyrene (PPE/HIPS), or polycarbonate/acrylonitrile-butadiene-styrene (PC/ABS).

However, these materials have a number of disadvantages during the production of the casings and during use of the finished devices. For example, firstly relatively long cycle times are required during the production of the casings by injection molding, and this results in correspondingly low productivity. Secondly, the materials currently used in the prior art give unsatisfactory surface quality and unsatisfactory precision of reproduction of the mold surface. For this reason, many housings then require additional lacquering. Other disadvantages which may be mentioned are the high susceptibility to stress cracking, which can make the housing fracture readily under mechanical stress, and the strong tendency toward yellowing on continuous exposure to UV radiation, particularly noticeable in pale-colored housings.

It is an object of the present invention, therefore, to provide a casing for an electronic device, in particular an electronic device which comprises a screen, for example a television, a video monitor, or a computer monitor, where the casing can be produced from a thermoplastic with halogen-free flame retardancy by an injection-molding process. The selection of this thermoplastic with halogen-free flame retardancy is to be such as to achieve a shortening of the cycle time during production together with simultaneous improvement in surface quality and precision of reproduction of the mold surface. A further intention is to reduce susceptibility to stress cracking and increase the resistance of plastic to yellowing.

We have found that this object is achieved by manufacturing the casing from a polyamide-based thermoplastic. Compared with the PPE/HIPS blends and PC/ABS blends used in the prior art, polyamide-based thermoplastics have improved surface quality together with a shorter cycle time in the injection mold.

For the purposes of the present invention, polyamide-based thermoplastics are plastics which comprise at least one polyamide. These may be either aliphatic or else partly aromatic polyamides, and may have either a partly crystalline structure or an amorphous structure. The casing constructed according to the invention for an electronic device is preferably manufactured from aliphatic polyamides. Particularly suitable materials here are nylon-6, nylon-6,6, nylon-6/6,6 copolyamides, or a mixture of these. The mixtures used here may also be mixtures composed of polyamides with identical monomer units and having different solution viscosity. To produce the casings it is preferable to use free-flowing polyamides whose solution viscosity is less than 140 ml/g, measured to ISO 307 in a sulfuric acid solution comprising 0.005 g/ml of specimen.

In order to comply with the requirements for fire protection, the thermoplatsics used to produce casings for electronic devices should be flame-retardant. It has been found that polyamides are flame-retardant even without the addition of flame retardants. The flame retardancy can be improved by adding flame retardants. DE-A-28 27 867 has previously disclosed thermoplastics with halogen-free flame retardancy. It uses phosphorus-containing carbon compounds in combination with a nitrogen base, namely melamine and/or dicyandiamide, and/or guanidine, as flame retardant. Furthermore, DE-A 196 07 635 discloses that the calcium and aluminum salts of phosphinic or diphosphinic acids may be used as flame-retardant additives in polyamide plastics.

It has been found that the use of melamine cyanurate achieves markedly improved flame retardancy even without the simultaneous use of phosphinic salts. The advantage of the use of melamine cyanurate as flame-retardant additive is therefore that it is also possible to omit the phosphorus-containing compounds.

Casings for televisions, video monitors or computer monitors are in particular large-surface-area components. If short cycle times and clean surfaces are to be achieved, a requirement is rapid distribution of the polymer melt within the mold. This is achieved by way of a low viscosity of the polymer melt. Furthermore, the injection pressures required to fill the mold cavity in the case of high-viscosity polymer melts are markedly higher than in the case of plastics with lower melt viscosity. In the case of high-viscosity melts and excessively low injection pressure, premature hardening of the polymer melt can occur in the mold before the melt has reached the edges of the workpiece, the components produced thus having an incorrect shape.

Examples are used below for further description of the invention.

To study the properties of the thermoplastics, in each case test plaques are injection molded using a test mold. These test plaques are used to test each of the following: UL 94 flame-retardancy classification, stress cracking resistance in contact with ethanol, UV yellowing, surface quality, and cycle time during injection molding. A study is made of the properties of the PPE/HIPS and ABS/PC currently used for producing casings for electronic devices. The results for the polyamide-based thermoplastics used according to the invention to produce casings are then compared with these latter results.

COMPARATIVE EXAMPLE C1

A study is made of the properties of PPE/HIPS, for example that obtainable with the name Noryl V 180 HF. The study of flame retardancy is carried out to UL 94 of Underwriters Laboratories Inc. For this, a vertically suspended test sheet is brought into contact with a flame, and then the rate of flame spread and the drop behavior of the plastic are examined. The flame-retardancy classifications, dependent on specimen thickness, are V-0, V-1, and V-2, V0 being the best classification.

UV yellowing is tested to ISO 4892. For this, the specimen is exposed at 0.55 W/m² to a beam of light at wavelength 340 nm for 1000 hours. The color is then measured using an Optronic Colour Flash 45.

To study stress-cracking resistance, a specimen is stored in ethanol for 7 days at room temperature. After this time, the specimen is dried, and the fall-off in ISO 527-2 tensile stress at break is measured. The value here is stated as a percentage of the initial tensile stress at break.

To determine the cycle time during the injection molding process, test pieces are injection molded in a test mold. To determine the cycle time, the time is shortened until the quality of the test pieces reduces.

The surface quality is determined by visual assessment of the surface quality of a test plaque, classifying the test plaque into classes from 1 to 5, 1 being very good and 5 being very poor.

The results of each of the studies are found in table 1.

COMPARATIVE EXAMPLE C2

A study is made of the properties of the commercial ABS/PC copolymer with the trademark Bayblend FR 2000 used to produce casings for electronic devices. The properties are studied as described in comparative example C1. The results are likewise found in table 1.

EXAMPLE 1

A study is made of the properties of a polyamide mixture with the following mixing specification:
59.00% of nylon-6 with a solution viscosity of about 150 ml/g
33.00% of nylon-6,6 with a solution viscosity of about 125 ml/g
8.00% of melamine cyanurate The additives mentioned are extruded in a twin-screw extruder to give a polyamide mixture, and then further processed in an injection-molding machine. The properties are studied as in comparative example C1. The results are likewise found in table 1.

EXAMPLE 2

In the mixing specification from example 1, the nylon-6,6 with a solution viscosity of about 125 ml/g is replaced by a nylon-6 with a solution viscosity of about 125 ml/g. The polyamide mixture is likewise produced in a twin-screw extruder and then further processed in an injection-molding machine. Here again, the properties are studied as in comparative example C1, and the results are shown in table 1.

EXAMPLE 3

A study is made of a polyamide produced in a twin-screw extruder using the following mixing specification:
100% of nylon-6 with a solution viscosity of about 150 ml/g The resultant polyamide is further processed in an injection-molding machine and subjected to the studies applied to the other plastics. Here again, the results are found in table 1.

EXAMPLE 4

A polyamide with the following mixing specification is produced in the twin-screw extruder:
100% of nylon-6,6 with a solution viscosity of about 150 ml/g This polyamide, too, is further processed in an injection-molding machine and subjected to studies the same as those applied to the other plastics. Here again, the results of these studies are found in table 1.

TABLE 1

| | Flame retardancy classification at 1.6 mm | UV yellowing | Stress cracking resistance | Cycle time | Surface quality |
|---|---|---|---|---|---|
| Comparative example C1 | V-1 | 25 | 21% | 77 s | 4 |
| Comparative example C2 | V-2 | 23 | 18% | 80 s | 4 |
| Example 1 | V-0 | 12 | 45% | 67 s | 2 |
| Example 2 | V-0 | 10 | 43% | 65 s | 2 |
| Example 3 | V-2 | 12 | 47% | 70 s | 3 |
| Example 4 | V-2 | 15 | 53% | 72 s | 3 |

We claim:

1. A casing of an electronic device comprising a cathode-ray tube or a flat screen, the casing being produced from a heat-resistant, flame-retardant thermoplastic by an injection-molding process, wherein the thermoplastic has a polyamide-based structure, characterized in that the thermoplastic comprises a mixture of at least two polyamides with different solution viscosity, said polyamides being free-flowing polyamides whose solution viscosity is less than 140 ml/g measured to ISO 307 in a sulfuric acid solution comprising 0.005 g/ml of specimen.

2. A casing as claimed in claim 1, wherein the thermoplastic comprises nylon-6.

3. A casing as claimed in claim 1, wherein the thermoplastic comprises nylon-6,6.

4. A casing as claimed in claim 1, wherein the polyamide-based thermoplastic comprises a non-halogenated flame retardant.

5. A casing as claimed in claim 4, wherein the flame retardant is melamine cyanurate.

6. A casing as claimed in claim 1, wherein the electronic device is a television device or a monitor.

* * * * *